US008744943B2

(12) United States Patent
Tenorio

(10) Patent No.: US 8,744,943 B2
(45) Date of Patent: *Jun. 3, 2014

(54) DISPLAYING VALUES SPECIFIED IN A NUMBER OF OFFERS FOR A NUMBER OF OFFER VARIABLES WITH RESPECT TO PRICE

(71) Applicant: JDA Software Group, Inc., Scottsdale, AZ (US)

(72) Inventor: Manoel Tenorio, Brasilia (BR)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,682

(22) Filed: Mar. 11, 2013

(65) Prior Publication Data

US 2013/0191237 A1  Jul. 25, 2013

Related U.S. Application Data

(63) Continuation of application No. 10/428,991, filed on May 1, 2003, now Pat. No. 8,396,767.

(60) Provisional application No. 60/378,175, filed on May 2, 2002.

(51) Int. Cl.
*G06Q 40/00* (2012.01)

(52) U.S. Cl.
USPC ............. 705/35; 705/7.29; 705/27; 705/36 R; 705/37; 705/38; 705/39; 705/78; 705/80; 707/3; 707/5; 707/102; 707/711; 707/752; 707/6; 707/10; 701/1; 700/99; 273/236; 386/279; 434/178

(58) Field of Classification Search
USPC .......... 705/7.29, 27, 35, 36 R, 37, 38, 39, 78, 705/80; 707/3, 5, 102, 711, 752; 701/1; 700/99; 1/1; 273/236; 386/279; 434/178
See application file for complete search history.

(56) References Cited

U.S. PATENT DOCUMENTS 4,939,594 A * 7/1990 Moxon et al. ................. 386/279
5,790,677 A * 8/1998 Fox et al. ........................ 705/78
(Continued)

OTHER PUBLICATIONS

Definition of Graph from dictionary.com (2 pages) printed on Sep. 13, 2007.

(Continued)

*Primary Examiner* — Muhammad Shafi
*Assistant Examiner* — Sanjeev Malhotra
(74) *Attorney, Agent, or Firm* — Jackson White, PC; Steven J. Laureanti

(57) ABSTRACT

A method for displaying values specified in a number of offers for a number of offer variables with respect to price includes receiving data for multiple offers that reflects values specified in the offers for multiple offer variables and generating a display of the received data. The display includes multiple offer variable windows that are each associated with an offer variable. Each offer variable window includes an offer price axis representing a range of offer prices and an offer variable axis substantially perpendicular to the offer price axis that represents a range of values for the offer variable associated with the offer variable window. Each offer variable window includes multiple bars. Each bar represents a value specified in offers for the offer variable associated with the offer variable window and is positioned with respect to the offer price axis according to an offer price specified in the offers.

20 Claims, 2 Drawing Sheets

(56) References Cited

U.S. PATENT DOCUMENTS

| | | | |
|---|---|---|---|
| 5,802,516 A * | 9/1998 | Shwarts et al. ............... 1/1 |
| 6,014,627 A * | 1/2000 | Togher et al. ............... 705/38 |
| 6,014,643 A * | 1/2000 | Minton ............... 705/36 R |
| 6,135,451 A * | 10/2000 | Kholodov ............... 273/236 |
| 6,336,112 B2 | 1/2002 | Chakrabarti et al. |
| 6,366,910 B1 * | 4/2002 | Rajaraman et al. ............... 1/1 |
| 6,466,918 B1 * | 10/2002 | Spiegel et al. ............... 705/7.29 |
| 6,490,567 B1 * | 12/2002 | Gregory ............... 705/39 |
| 6,536,935 B2 * | 3/2003 | Parunak et al. ............... 700/99 |
| 6,581,072 B1 * | 6/2003 | Mathur et al. ............... 707/711 |
| 6,708,174 B1 * | 3/2004 | Tenorio ............... 1/1 |
| 6,745,177 B2 * | 6/2004 | Kepler et al. ............... 1/1 |
| 6,763,356 B2 | 7/2004 | Borchers |
| 6,963,867 B2 * | 11/2005 | Ford et al. ............... 707/752 |
| 6,993,511 B2 * | 1/2006 | Himmelstein ............... 705/80 |
| 7,228,289 B2 | 6/2007 | Brumfield et al. |
| 7,349,879 B2 | 3/2008 | Alsberg et al. |
| 7,401,073 B2 | 7/2008 | Carmel et al. |
| 7,472,077 B2 | 12/2008 | Roseman et al. |
| 7,565,313 B2 | 7/2009 | Waelbroeck et al. |
| 8,396,767 B2 | 3/2013 | Tenorio |
| 2001/0016846 A1 * | 8/2001 | Chakrabarti et al. ............... 707/102 |
| 2001/0032162 A1 * | 10/2001 | Alsberg et al. ............... 705/37 |
| 2001/0049651 A1 * | 12/2001 | Selleck ............... 705/37 |
| 2002/0029201 A1 * | 3/2002 | Barzilai et al. ............... 705/80 |
| 2002/0042668 A1 * | 4/2002 | Shirato et al. ............... 701/1 |
| 2002/0099639 A1 * | 7/2002 | Caughey et al. ............... 705/37 |
| 2002/0147704 A1 * | 10/2002 | Borchers ............... 707/3 |
| 2003/0003428 A1 * | 1/2003 | Dalstrom ............... 434/178 |
| 2003/0195877 A1 * | 10/2003 | Ford et al. ............... 707/3 |
| 2003/0200156 A1 * | 10/2003 | Roseman et al. ............... 705/27 |
| 2003/0208424 A1 * | 11/2003 | Tenorio ............... 705/35 |
| 2004/0034591 A1 * | 2/2004 | Waelbroeck et al. ............... 705/37 |
| 2004/0117292 A1 * | 6/2004 | Brumfield et al. ............... 705/37 |
| 2005/0177498 A1 * | 8/2005 | Tenorio ............... 705/39 |
| 2006/0248074 A1 * | 11/2006 | Carmel et al. ............... 707/5 |

OTHER PUBLICATIONS

Definition of Bar Graph from dictionary.com (1 page) printed on Sep. 13, 2007.
DealTime.com about Dynamic Pricing Engine dated May 1, 2000 (2 pages).
DealTime.com internet archive history from Way Back Machine (8 pages) May 6, 2009.
StreetPrices.com showing Chase the Trends Graphs dated Jan. 25, 1999 (1 page).
StreetPrices.com sample of Digital Cameras Graph showing price comparison (2 pages) May 6, 2009.
PriceGrabber.com showing six articles about Online Shopping (6 pages) dated May 24, 2000 (on 1st page) to Nov. 28, 1999 (on 6th page).
PriceGrabber.com internet archive history from the Way Back Machine (5 pages) May 6, 2009.
PriceGrabber.com sample Graph showing price comparison (2 pages) May 6, 2009.
Synonyms from thesaurus.com of 'bid' and 'ask' (p. 1) Sep. 13, 2007.
StreetPrices.com internet archive history from the Way Back Machine (5 pages).

* cited by examiner

DISPLAYING VALUES SPECIFIED IN A NUMBER OF OFFERS FOR A NUMBER OF OFFER VARIABLES WITH RESPECT TO PRICE

CROSS-REFERENCE TO RELATED APPLICATIONS

This application is a continuation of U.S. patent application Ser. No. 10/428,991, now U.S. Pat. No. 8,396,767 filed on May 1, 2003 and entitled "Displaying Values Specified in a Number of Offers for a Number of Offer Variables with Respect to Price," which claims the benefit of U.S. Provisional Application No. 60/378,175, filed May 2, 2002, and entitled "Displaying Values Specified in a Number of Offers for a Number of Offer Variables with Respect to Price." U.S. Pat. No. 8,396,767 and U.S. Provisional Patent Application No. 60/378,175 are assigned to the assignee of the present application. The disclosure of related U.S. Pat. No. 8,396,767 and U.S. Provisional Patent Application No. 60/378,175 are hereby incorporated by reference into the present disclosure as if fully set forth herein.

TECHNICAL FIELD OF THE INVENTION

This invention relates generally to electronic commerce and more particularly to displaying values specified in a number of offers for a number of offer variables with respect to price.

BACKGROUND OF THE INVENTION

Business transactions are increasingly taking place over the Internet and other electronic communication networks. Electronic markets may provide a forum for such transactions, allowing buyers to locate sellers, and vice versa. This process may involve a buyer (or seller) identifying one or more suitable offers to sell (or buy) from one or more sellers (or buyers). However, it may be difficult for a buyer (or seller) to identify suitable offers to sell (or buy) from among the offers available to the buyer (or seller). It may also be difficult for a buyer (or seller) to determine relationships among the offer variables for a number of offers, which may be an important part of making buy (or sell) decisions. For example, the market may include a relatively large number of offers. Such offers may include a number of offer variables, and there may be a relatively large number of possible values for each offer variable. As a result, there may be a relatively large amount of information for a buyer (or seller) to consider when trying to identify suitable offers to sell and make buy (or sell) decisions.

SUMMARY OF THE INVENTION

According to the present invention, disadvantages and problems associated with previous techniques for displaying market data may be substantially reduced or eliminated.

In one embodiment of the present invention, a method for displaying values specified in a number of offers for a number of offer variables with respect to price includes receiving data for multiple offers that reflects values specified in the offers for multiple offer variables and generating a display of the received data. The display includes multiple offer variable windows that are each associated with an offer variable. Each offer variable window includes an offer price axis representing a range of offer prices and an offer variable axis substantially perpendicular to the offer price axis that represents a range of values for the offer variable associated with the offer variable window. Each offer variable window includes multiple bars. Each bar represents a value specified in one or more offers for the offer variable associated with the offer variable window and is positioned with respect to the offer price axis according to an offer price specified in the one or more offers. A height of the bar with respect to the offer variable axis represents the value specified in the one or more offers for the offer variable associated with the offer variable window. Each bar is associated with a quantity indicator that indicates a quantity of items specified in the one or more offers. In each offer variable window, a marker substantially perpendicular to the offer price axis visually marks a particular offer price that is linked to every other marker within every other offer variable window such that the markers are operable to visually mark substantially equal offer prices within the multiple offer variable windows. The marker is movable by a user to visually mark a particular offer price and, in response to being moved by the user, automatically causes every other marker within every other offer variable window to move to visually mark the particular offer price within the other offer variable windows.

Particular embodiments of the present invention may provide one or more technical advantages. For example, particular embodiments of the present invention may provide a display of values specified in a number of offers for a number of offer variables with respect to price, which may enable a user to more readily ascertain market conditions. In particular embodiments, one or more markers overlaying such a display may together be used to facilitate identification of multiple values specified in one or more particular offers for multiple offer variables. Particular embodiments may automatically generate one or more orders and communicate the generated orders for matching with one or more offers. Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and features and advantages thereof, reference is made to the following description taken in conjunction with the accompanying drawings, in which.

DETAILED DESCRIPTION OF THE INVENTION

Figure 1:
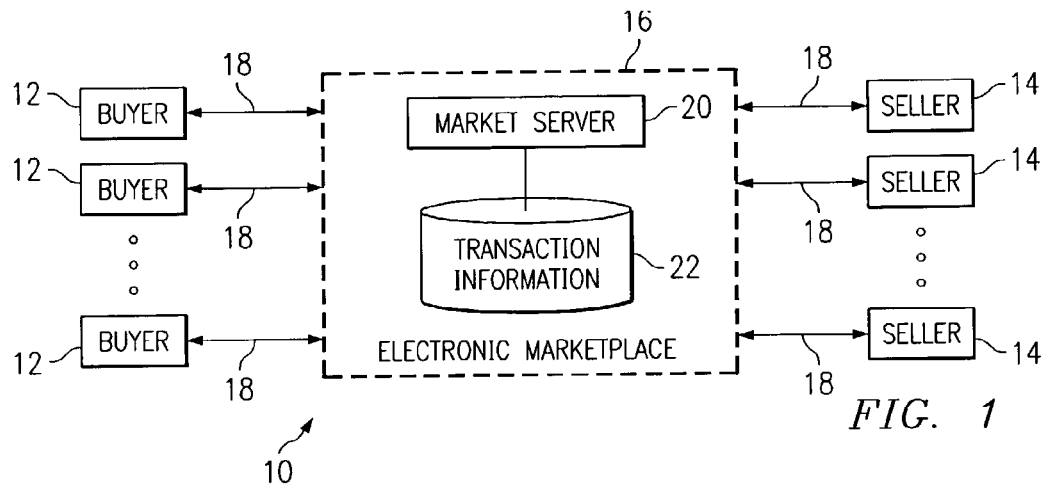
FIG. 1 illustrates an example system for displaying values specified in a number of offers for a number of offer variables with respect to price.

FIG. 1 illustrates an example system 10 for displaying values specified in a number of offers for a number of offer variables with respect to price. System 10 may include one or more buyers 12, one or more sellers 14, and at least one electronic marketplace 16 associated with a web site or other environment accessible to buyers 12 and sellers 14. In general, electronic marketplace 16 may receive bids from buyers 12 and asks from sellers 14, match bids and asks where appropriate, and initiate transactions between buyers 12 and sellers 14 where appropriate. A bid may be matched with an ask, for example, where the corresponding bid price is greater than or substantially equal to the corresponding ask price, and matching a bid with an ask may result in a transaction being initiated between the corresponding buyer 12 and seller 14. A bid may include an offer to buy, and an ask may include an offer to sell. Such offers may include a number of offer variables, and each offer may specify a value for one or more of these offer variables. For example, a bid may specify a bid price, a bid quantity, a delivery time, and values for any other suitable offer variables. The present invention contemplates any suitable offers including any suitable offer variables. Reference to an "offer" may include a bid, an ask, or either, where appropriate.

Although example markets are described herein, the present invention contemplates any suitable market including one or more offers from one or more buyers 12 and one or more sellers 14. For example, the present invention may provide a display of values for a number of offer variables specified in a number of offers in an auction-based market, an exchange-based market, a Request for Quote (RFQ)-based market, or any other suitable market. Additionally, the present invention may provide a display of values for a number of offer variables specified in a number of offers in a market that is part of a larger market including a number of associated markets. Although buyers 12 and sellers 14 are described as separate entities, a buyer 12 in one transaction may be a seller 14 in another transaction, and vice versa. Moreover, reference to a "buyer" or a "seller" may include a person, a computer system that includes one or more computers, an enterprise, or any other buying or selling entity, as appropriate. For example, a buyer 12 may include a computer programmed to autonomously identify a need for an item, search for that item, and buy that item upon identifying a suitable offer. Although buying and selling are primarily described herein, the present invention contemplates any appropriate market transaction. Items may include raw materials, component parts, products, or any other tangible or intangible things that may be the subject of a transaction between a buyer 12 and a seller 14, and a single item may include one or more other items. Additionally, items may include lots, blocks, bundles, bushels, or other suitable units of one or more individual items, where appropriate. For example, capacitors may be bought and sold in indivisible units of five hundred capacitors, instead of one capacitor at a time.

Buyers 12, sellers 14, and electronic marketplace 16 may be coupled to each other using links 18 that may each include one or more local area networks (LANs), metropolitan area networks (MANs), wide area networks (WANs), a portion of the Internet, or any other appropriate wireline, optical, wireless, or other links. The components of electronic marketplace 16 may operate on one or more computers at one or more locations, and electronic marketplace 16 may share one or more computers or other resources with one or more buyers 12, one or more sellers 14, or both according to particular needs. Bids and asks may be received by electronic marketplace 16 or an associated device in any suitable format, such as in the form of Hypertext Markup Language (HTML), Extensible Markup Language (XML), or other suitable files within Hypertext Transport Protocol (HTTP) or other suitable messages.

Associated with electronic marketplace 16 may be one or more market servers 20 and one or more databases containing transaction information 22. In general, market server 20 may support a particular electronic market for a particular item. For example, market server 20 may receive bids from buyers 12 and asks from sellers 14, prioritize bids and asks, match bids with asks where appropriate, initiate transactions between buyers 12 and sellers 14 where appropriate, cancel or otherwise remove from the market a bid or ask (automatically or at the request of the corresponding buyer 12 or seller 14), keep a record of initiated transactions by storing associated transaction information 22, and perform other suitable tasks associated with supporting an electronic market. In addition, market server 20 may perform tasks associated with generating a display of values specified in a number of offers for a number of offer variables with respect to price. For example, market server 20 may communicate data reflecting offers in the market to one or more buyers 12, sellers 14, or other suitable entities, which data may be used by the recipients to generate displays of offer variables with respect to price for a number of offers. Transaction information 22 may include a number of records, each corresponding to a particular initiated transaction. A record of an initiated transaction may reflect one or more transaction terms, which may be the terms of the accepted offer. Such terms may include a transaction price, a transaction quantity, and other suitable transaction terms. Transaction information 22 may be used by buyer 12, seller 14, and any other appropriate entities to finalize a transaction between buyer 12 and seller 14 initiated as the result of a strike or for any other suitable purposes.

Figure 2:
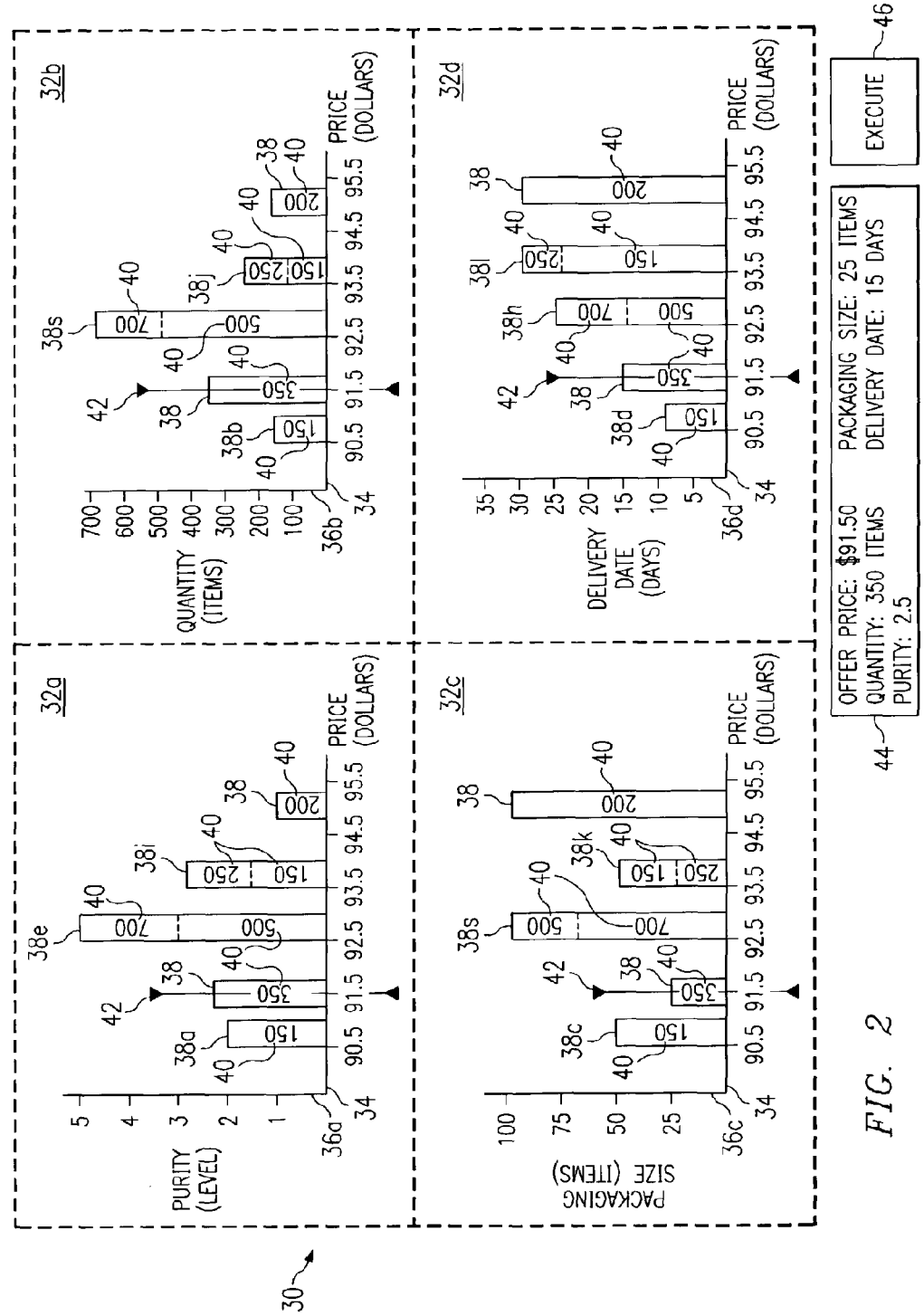
FIG. 2 illustrates an example display of values specified in a number of offers for a number of offer variables with respect to price.

FIG. 2 illustrates an example display 30 of values specified in a number of offers for a number of offer variables with respect to price. Display 30 may be generated in any suitable manner for use by any suitable entities. For example, market server 20 may communicate data reflecting strikes between bids and asks to a computer system associated with a buyer 12 or seller 14, which computer system may, using the communicated data, generate display 30 for the exclusive use of buyer 12 or seller 14. As another example, market server 20 may locally generate all or certain portions of display 30 for a buyer 12 or seller 14 and communicate corresponding display data to a computer system associated with buyer 12 or seller 14 for the exclusive use of buyer 12 or seller 14. As another example, market server 30 may locally generate certain portions of display 30 for use by a number of buyers 12 and sellers 14 and communicate corresponding display data to computer systems associated with buyers 12 and sellers 14, which computer systems may modify display 30 according to particular needs. Although example markets are described herein, the present invention contemplates any suitable market in which offers to buy are matched with offers to sell. For example, the present invention may provide a display of values for a number of offer variables specified in a number of offers in an auction-based market, an exchange-based market, an RFQ-based market, or any other suitable market. Additionally, the present invention may provide a display of values for a number of offer variables specified in a number of offers in a market that is part of a larger market including a number of associated markets. Display 30 may be updated as changes occur in the market (which may include new offers being placed on the market, old offers being removed from the market, and possibly other changes) to provide a substantially real-time display of values specified in a number of offers for a number of offer variables with respect to price.

Display 30 may include one or more windows 32 each displaying values specified in a number of offers for a particular offer variable with respect to price. The offers may be associated with the bid side or the ask side of a market. Each window 32 within display 30 may be associated with a different offer variable. A window 32 may include a price axis 34 and an offer variable axis 36, which axes may be substantially perpendicular to each other. Price axis 34 may include a range of prices (which may in particular embodiments be stated in dollars), and offer variable axis 36 may include a range of values for an offer variable other than price. A window 32 may also include a number of bars 38 each representing a value specified in one or more offers for the offer variable associated with window 32 having substantially equal prices. Each bar 38 may be positioned with respect to price axis 34 according to the substantially equal prices specified in the one or more corresponding offers, and the height of each bar 38 with respect to offer variable axis 36 may reflect the represented value for the offer variable associated with window 32. As described above, an offer may specify a value for each of a number of offer variables. Accordingly, a bar 38 in one window 32 may correspond to a bar 38 in each of one or more other windows 32.

Where two or more offers specifying substantially equal offer prices specify different values for an offer variable, bars 38 representing the different values for the offer variable may be displayed such that they overlap within a window 32 associated with the offer variable. Shorter overlapping bars 38 may be displayed over taller overlapping bars 38, such that each overlapping bar 38 may be visible to a user. In addition, each overlapping bar 38 may be made visibly distinguishable from every other overlapping bar 38. As an example, a visible portion of each overlapping bar 38 may be given a substantially unique color, shading, or marking making overlapping bar 38 visibly distinguishable from other overlapping bars 38. Associated with each bar 38 may be one or more quantity indicators 40 which may each indicate a quantity specified in one or more offers corresponding to bar 38. A quantity indicator 40 may include a number indicating a quantity (such as an aggregate quantity specified in all, one, or more offer corresponding to bar 38, each such offer having a substantially equal price and a substantially equal value for the offer variable) and may be placed such that a user may visually associate quantity indicator 40 with a corresponding bar 38. For example, a quantity indicator 40 may be placed within or substantially near a corresponding bar 38.

As an example of the concepts described above and not by way of limitation, window 32a may be associated with a purity offer variable, window 32b may be associated with a quantity offer variable, window 32c may be associated with a packaging size offer variable, and window 32d may be associated with delivery date offer variable. Offer variable axis 36a within window 32a may include a range of purity values, offer variable axis 36b within window 32b may include a range of quantity values, offer variable axis 36c within window 32c may include a range of packaging size values, and offer variable axis 36d within window 32d may include a range of delivery date values (which values may each include, for example, a number of days from a current date). Bars 38 within window 32a may each represent a purity value specified in one or more offers, bars 38 within window 32b may each represent a quantity value specified in one or more offers, bars 38 within window 32c may each represent a packaging size value specified in one or more offers, and bars 38 within window 32d may each represent a delivery date value specified in one or more offers.

Seven offers are represented within example display 30: (1) a first offer specifying a price of ninety dollars and seventy-five cents (which may, for example, include a per-item price), a purity value of two, a quantity value of one-hundred fifty items, a packaging size value of fifty items, and a delivery date value of ten days; (2) a second offer specifying a price of ninety-one dollars and fifty cents, a purity value of two and one-half, a quantity value of three-hundred fifty items, a packaging size value of twenty-five items, and a delivery date value of fifteen days; (3) a third offer specifying a price of ninety-two dollars and seventy-five cents, a purity value of five, a quantity value of seven-hundred items, a packaging size value of seventy items, and a delivery date value of twenty-five days; (4) a fourth offer specifying a price of ninety-two dollars and seventy-five cents, a purity value of three, a quantity value of five-hundred items, a packaging size value of one-hundred items, and a delivery date value of fifteen days; (5) a fifth offer specifying a price of ninety-three dollars and seventy-five cents, a purity value of three, a quantity value of two-hundred fifty items, a packaging size value of twenty-five items, and a delivery date value of thirty days; (6) a sixth offer specifying a price of ninety-three dollars and seventy-five cents, a purity value of one and one-half, a quantity value of one-hundred fifty items, a packaging size value of fifty items, and a delivery date value of twenty-five days; and (7) a seventh offer specifying a price of ninety-five dollars and seventy-five cents, a purity value of one, a quantity value of two-hundred items, a packaging size value of one-hundred items, and a delivery date value of thirty days. Although a particular number of example offers with particular example values for particular example offer variables are illustrated and described, the present invention contemplates any suitable number of offers having any values for any offer variables being displayed within display 30. The offers displayed within display 30 may be associated with either the bid side or the ask side of a market and thus may include either bids or asks.

A bar 38 within a window 32 may correspond to a bar 38 in every other window 32, each corresponding bar 38 representing a value specified in the associated offer for a different offer variable. Each such bar 38 may be similarly positioned with respect to price axes 34 within windows 32. Thus, bars 38a, 38b, 38c, and 38d may represent values specified in the first offer described above for a purity offer variable, a quantity offer variable, a packaging size offer variable, and a delivery date offer variable, respectively. The third and fourth offers described above both specify an offer price of ninety-two dollars and seventy-five cents, such that bars 38 representing values for an offer variable specified in the third and fourth offers may overlap. Similarly, the fifth and sixth offers described above both specify an offer price of ninety-three dollars and seventy-five cents, such that bars 38 representing values for an offer variable specified in the third and fourth offers may overlap. Bars 38e, 38f, 38g, and 38h may thus each include two bars 38, one representing a value specified in the third offer for an offer variable and the other representing a value specified in the fourth offer for the offer variable. The same is true for bars 38i, 38j, 38k, and 38l. For each such overlapping pair of bars 38, the shorter of the two bars 38 may be displayed over the taller of the two and may be made visible distinguishable from the taller of the two.

One or more approved market participant lists may be incorporated into display 30 automatically or at the request of a user. An approved market participant list may include an approved vendor list (AVL) for a buyer 12 or an approved buyer list for a seller 14, as appropriate. Market participants may be excluded from an approved market participant list for any suitable reason. For example, a buyer 12 may exclude from an AVL all sellers 14 not within a certain geographical area. Approved market participant lists for a particular entity may vary from item to item. For example, an AVL for item A for a buyer 12 may include a particular seller 14, while an AVL for item B for buyer 12 may exclude that seller 14. An approved market participant list may be incorporated into display 30 in any suitable manner. For example, offers from market participants excluded from an applicable market participant list may be excluded from any representation within display 30. As an alternative, offers from market participants excluded from an applicable market participant list may be represented within display 30, but an indication may be given where an aspect of one or more of such offers is represented within display 30. For example, a bar 38 representing a value specified in one or more offers from excluded market participant (and not in one or more offers from included market participants) may be given a particular color or visually marked in another suitable manner such that a user may distinguish bar 38 from other bars 38 within display 30.

Each window 32 may include a marker 42 for visually marking a particular price with respect to price axis 34 within window 32. Marker 42 may include any suitable visual marker for marking a particular price with respect to price axis 34. In one embodiment, for example, marker 42 may include a line segment substantially perpendicular to price axis 34, as shown in FIG. 2, positioned with respect to price axis 34 to mark a particular price. Marker 42 may be moved within window 32. For example, a user may change the position of marker 42 with respect to price axis 34 to mark a different price. A user may change the position of marker 42 by, for example, selecting marker 42 and moving it to a different position with respect to price axis 34. Two or more markers 42 within different windows 32, and preferably all markers 42 within all windows 32, may be linked to each other such that the position of one linked marker 42 may be reflected in every other linked marker 42. For example, linked markers 42 may each mark the same price with respect to price axes 34 within windows 32 within display 30. In particular embodiments, the movement of one linked marker 42 may be reflected in every other linked marker 42. For example, a change in the position of one linked marker 42 by a user may cause an automatic, corresponding change in the position of every other linked marker 42. Linking two or markers 42 in this way may enable a user to more easily determine relationships between offer variables for a number of offers in a market. Where linked markers 42 each mark the same price with respect to price axes 34 within windows 32 within display 30, for example, a user may more easily determine the availability of particular values for particular offer variables at a particular offered price.

Display 30 may include a window 44 for entering one or more queries, orders, or other requests. A request may include values for one or more offer variables. For example, a user may enter a value for an offer variable associated with a window 32 and, if the entered value is specified in an offer represented within display 30, one or more values for other offer variables specified in the offer may automatically appear within window 44. Where a user enters a value for an offer variable and the entered value is specified in two or more offers represented within display 30, each such offer may be displayed within window 44. In addition or as an alternative to each such offer being displayed within window 44, the user may be given an opportunity to select from among the offers specifying the entered value. For example, the user may select an offer displayed within window 44 and the unselected offers may be removed from window 44. Markers 42 described above may be used in connection with window 44. For example, a user may move a marker 42 within a window 32 to a position with respect to a price axis 34 within window 32 that is occupied by a bar 38 within window 32. In response to the user moving marker 42, an offer specifying the value represented by bar 38 for the offer variable associated with window 32 may be displayed within window 44. Where a user moves a marker 42 within a window 32 to a position with respect to a price axis 34 within window 32 that is occupied by two or more overlapping bars 38, the user may be given an opportunity to select one of the overlapping bars 38. Upon the user selecting one of the overlapping bars 38, an offer specifying the value represented by the selected bar 38 may be displayed within window 44.

Display 30 may also include execution icon 46, which may facilitate order entry. A user may select execution icon 46 to cause an order to be automatically generated based on an offer displayed within window 44 or elsewhere within display 30 and communicated to market server 20. Any suitable combination of hardware and software supporting display 30 may generate an order and communicate it to market server 20. Upon receipt of an order generated in response to a user selecting icon 46, market server 20 may match the order with one or more appropriate offers and initiate one or more transactions between one or more appropriate buyers 12 and sellers 14.

Figure 3:
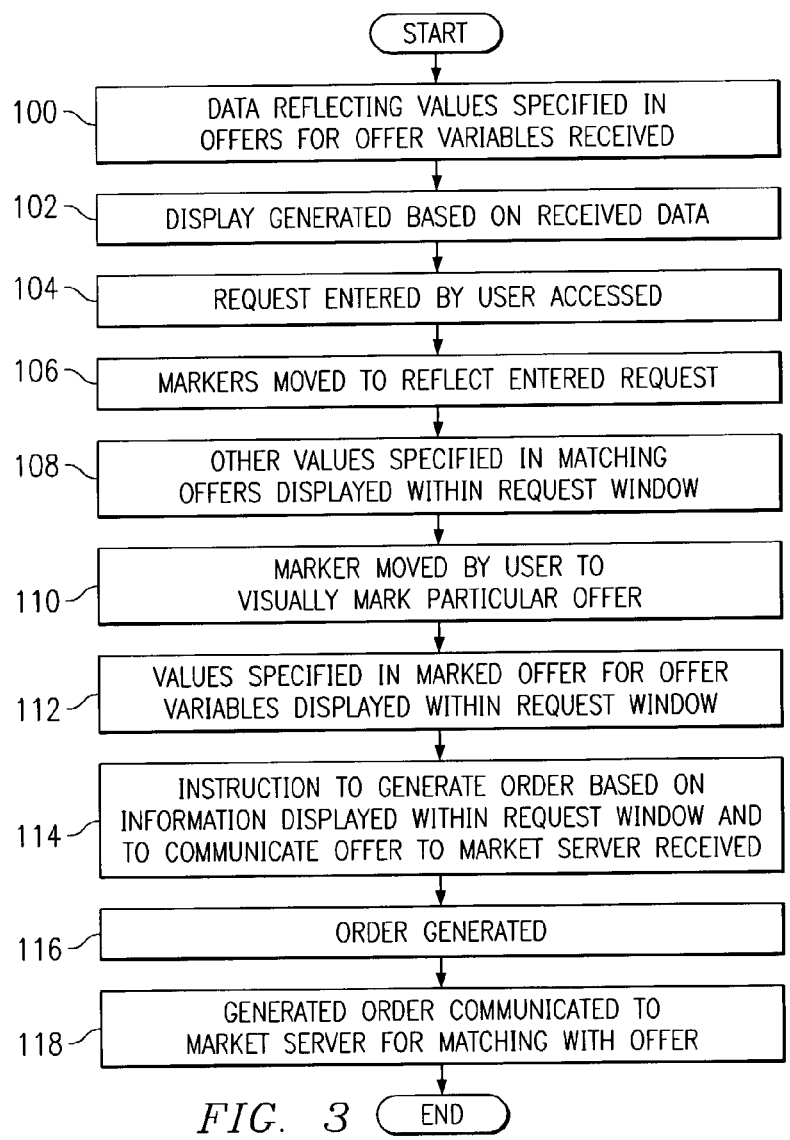
FIG. 3 illustrates an example method for generating a display of values specified in a number of offers for a number of offer variables with respect to price.

FIG. 3 illustrates an example method for generating a display of values specified in a number of offers for a number of offer variables with respect to price. The method begins at step 100, where a computer system associated with a buyer 12, seller 14, or any other suitable entity receives data reflecting values specified in a number of offers in a market. As described above, the data may be received from a market server 20 supporting the market. Although display 30 is described as being locally generated using data received from a market server 20, display 30 may be generated in any suitable manner, as described above. At step 102, the computer system generates display 30 based on the received data. As described above, display 30 may include one or more windows 32 each displaying values specified in a number of offers for a particular associated offer variable with respect to price using bars 38. Each such bar 38 may represent a value specified in one or more offers for the offer variable associated with window 32. Windows 32 may also include quantity indicators 40 and markers 42 as described above. Display 30 may also include one or more windows 44 for entering one or more queries, orders, or other requests and one or more execution icons 46, also described above. At step 104, the computer system accesses a request entered by a user. The request may have been entered using window 36 and may include one or more values for one or more offer variables. At step 106, the computer system moves one or more markers 42 within one or more windows 32 to provide visualization of the entered request within windows 32. The request may substantially match one or more offers reflected in display 30, and one or more markers 42 may be moved to provide visualization of one or more values specified in the one or more matching offers that were not included in the entered request. At step 108, the computer system displays within window 44 the one or more other values specified in one or more matching offers. As described above, the user may be given an opportunity to select from among two or more offers that each specify the value in the request entered by the user where two or more offers each specify the value in the request entered by the user.

At step 110, the user moves a marker 42 within a window 32 such that marker 42 visually marks a particular offer reflected in display 30. As described above, the user may move marker 42 by selecting marker 42 and moving marker 42 to a certain position with respect to a price axis 34 within window 32. At step 112, in response to the user moving marker 42, the computer system displays within window 44 one or more values specified in the marked offer for one or more offer variables. At step 114, the computer system receives an instruction from the user to generate an order based on the information displayed within window 44 for communication to market server 20 for matching with an appropriate offer. As described above, the user may provide such an instruction by selecting execution icon 46. At step 116, the computer system generates an order based on information displayed within window. As described above, the generated order may specify the values displayed within window 44. Additionally, the generated order may, in particular embodiments, specify a seller 14 with which the order should be matched. At step 118, the computer system communicates the generated order to market server 20 for matching with an appropriate offer, and the method ends.

Although the present invention has been described with several embodiments, sundry changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. A computer system, comprising:
the computer system coupled with a plurality of buyer computers and a plurality of seller computers, the computer system configured to:
generate a plurality of offer window variables comparisons each associated with one of a plurality of offer window variables comparisons, each one of the plurality of offer window variables comparisons comprising:
a plurality of sets of bar data, each representing a value specified in one or more of a plurality of offers for an offer variable associated with the offer window variables comparisons and corresponding with an offer price specified in one or more of the plurality of offers, wherein the bar data, with respect to the offer variable represents the value specified in one or more of the plurality of offers for the offer variable associated with the offer window variables comparisons, each set of bar data associated with a quantity indicator that indicates a quantity of items specified in one or more of the plurality of offers wherein at least one set of bar data of the plurality of sets of bar data corresponds with at least one set of bar data in one or more other offer window variables comparisons.

2. The system of claim 1, wherein the plurality of offers comprise asks only from approved sellers.

3. The system of claim 1, wherein the offer variables comprise one or more of a purity offer variable, a quantity offer variable, a packaging size offer variable, and a delivery date offer variable.

4. The system of claim 1, wherein:
two or more offers specifying substantially equal offer prices specify substantially different values for an offer variable; and
two or more sets of bar data within an offer window variables comparisons associated with the offer variable represent substantially different values specified in the two or more offers.

5. The system of claim 1, further comprising an electronic marketplace.

6. The system of claim 1, wherein each one of the plurality of offer window variables comparisons further comprises a marker that determines a particular offer price and is linked with other markers within the other offer window variables comparisons.

7. The system of claim 1, wherein the computer system is further configured to access a user request to identify a particular offer price, and in response automatically move the other markers within the offer window variables comparisons to mark the particular offer price within the offer window variables.

8. A computer method, comprising:
generating, by a computer system, a plurality of offer window variables comparisons, each associated with one of a plurality of offer window variables comparisons, each one of the plurality of offer window variables comparisons comprising:
a plurality of sets of bar data, each representing a value specified in one or more of the plurality of offers for an offer variable associated with the offer window variables comparisons and corresponding with an offer price specified in one or more of the plurality of offers, wherein of the bar data, with respect to the offer variable, represents the value specified in one or more of the plurality of offers for the offer variable associated with the offer window variables comparisons, each set of bar data associated with a quantity indicator that indicates a quantity of items specified in one or more of the plurality of offers wherein at least one set of bar data of the plurality of sets of bar data corresponds with at least one set of bar data in one or more other offer window variables comparisons.

9. The method of claim 8, wherein the plurality of offers comprise asks only from approved sellers.

10. The method of claim 8, wherein the offer variables comprise one or more of a purity offer variable, a quantity offer variable, a packaging size offer variable, and a delivery date offer variable.

11. The method of claim 8, wherein:
two or more offers specifying substantially equal offer prices specify substantially different values for an offer variable; and
two or more sets of bar data within an offer window variables comparisons associated with the offer variable represent substantially different values specified in the two or more offers.

12. The method of claim 8, wherein each one of the plurality of offer window variables comparisons further comprises a marker that determines a particular offer price and is linked with other markers within the other offer window variables comparisons.

13. The method of claim 8, further comprising accessing a user request to identify a particular offer price, and in response automatically move the other markers within the offer window variables comparisons to mark the particular offer price within the offer window variables.

14. A non-transitory computer-readable media embodied with software that when executed using one or more computer systems is configured to:
generate a plurality of offer window variables comparisons, each associated with one of a plurality of offer window variables comparisons, each one of the plurality of offer window variables comparisons comprising:
a plurality of sets of bar data, each representing a value specified in one or more of a plurality of offers for an offer variable associated with the offer window variables comparisons and corresponding with an offer price specified in one or more of the plurality of offers, wherein of the bar data, with respect to the offer variable, represents the value specified in one or more of the plurality of offers for the offer variable associated with the offer window variables comparisons, each set of bar data associated with a quantity indicator that indicates a quantity of items specified in one or more of the plurality of offers wherein at least one set of bar data of the plurality of sets of bar data corresponds with at least one set of bar data in one or more other offer window variables comparisons.

15. The non-transitory computer-readable media of claim 14, wherein the plurality of offers comprise asks only from approved sellers.

16. The non-transitory computer-readable media of claim 14, wherein the offer variables comprise one or more of a purity offer variable, a quantity offer variable, a packaging size offer variable, and a delivery date offer variable.

17. The non-transitory computer-readable media of claim 14, wherein:
  two or more offers specifying substantially equal offer prices specify substantially different values for an offer variable; and
  two or more sets of bar data within an offer window variables comparisons associated with the offer variable represent substantially different values specified in the two or more offers.

18. The non-transitory computer-readable media of claim 14, wherein the software is executed by one or more computer systems associated with an electronic marketplace.

19. The non-transitory computer-readable media of claim 14, wherein each one of the plurality of offer window variables comparisons further comprises a marker that determines a particular offer price and is linked with other markers within the other offer window variables comparisons.

20. The non-transitory computer-readable media of claim 14, wherein the software is further configured to access a user request to identify a particular offer price, and in response automatically move the other markers within the offer window variables comparisons to mark the particular offer price within the offer window variables.

* * * * *